US012055321B2

(12) United States Patent
Fu et al.

(10) Patent No.: US 12,055,321 B2
(45) Date of Patent: Aug. 6, 2024

(54) FILM TYPE LIQUID HEATER AND UNIFORM HEATING METHOD THEREOF

(71) Applicant: ZHEJIANG CHEER TECHNOLOGY CO., LTD., Hangzhou (CN)

(72) Inventors: Xin Fu, Hangzhou (CN); Zheng Luo, Hangzhou (CN); Yiwen Zhao, Hangzhou (CN); Sen Du, Hangzhou (CN); Ning Xu, Hangzhou (CN)

(73) Assignee: ZHEJIANG CHEER TECHNOLOGY CO., LTD., Hangzhou (CN)

( * ) Notice: Subject to any disclaimer, the term of this patent is extended or adjusted under 35 U.S.C. 154(b) by 481 days.

(21) Appl. No.: 17/139,906

(22) Filed: Dec. 31, 2020

(65) Prior Publication Data

US 2022/0136733 A1 May 5, 2022

(30) Foreign Application Priority Data

Oct. 29, 2020 (CN) ......................... 202011178865.9

(51) Int. Cl.
*F24H 1/12* (2022.01)
*F24H 1/00* (2022.01)
(Continued)

(52) U.S. Cl.
CPC ........... *F24H 1/121* (2013.01); *F24H 1/0018* (2013.01); *F24H 1/106* (2013.01); *H05B 3/42* (2013.01);
(Continued)

(58) Field of Classification Search
CPC ........ F24H 1/121; F24H 1/0018; F24H 1/106; F24H 2250/02; H05B 3/42; H05B 2203/021
(Continued)

(56) References Cited

U.S. PATENT DOCUMENTS

| | | | | |
|---|---|---|---|---|
| 3,846,621 A * | 11/1974 | Roos | ........................ | H05B 3/42 219/544 |
| 2004/0028396 A1* | 2/2004 | Russegger | ............... | H05B 3/42 392/441 |

(Continued)

FOREIGN PATENT DOCUMENTS

CN 205481695 U * 8/2016

OTHER PUBLICATIONS

Translation of CN-205481695-U (Year: 2016).*

*Primary Examiner* — Helena Kosanovic
*Assistant Examiner* — Yeong Juen Thong
(74) *Attorney, Agent, or Firm* — Jiwen Chen; Joywin IP Law PLLC

(57) ABSTRACT

The present invention discloses a film type liquid heater and a uniform heating method thereof. End fixation plates are arranged at two ends of a barrel. A heating pipe is arranged in the barrel. Pipe ports run through the two end fixation plates, respectively. Connecting pipes are arranged in the pipe ports. Sealing connection components are arranged at inner ends of the two connecting pipes. A heating film layer is coated outside the heating pipe. Electrode layers are connected left and right sides of the heating film layer, and the electrode layers are connected to an external power supply. An insulating layer is coated outside the heating film layer. A flow splitting column is fixedly connected in the heating pipe. A heating chamber is formed between an inner side of the heating pipe and the flow splitting column. Flow splitting grooves are formed at left and right ends and on the inner side of the flow splitting column. Two outer ends of the flow splitting grooves are communicated with the connecting pipes, and the flow splitting grooves are communicated with the heating chamber. The heating film layer is electrified to generate heat. The heat is conducted inward to the heating pipe and the flow splitting column, and conducted
(Continued)

outward to the barrel. Liquid flows into the heating chamber through the connecting pipes and the flow splitting grooves, so that the heating uniformity of the liquid flow flowing through the heating chamber is improved.

8 Claims, 2 Drawing Sheets

(51) Int. Cl.
*F24H 1/10* (2022.01)
*H05B 3/42* (2006.01)

(52) U.S. Cl.
CPC .... *F24H 2250/02* (2013.01); *H05B 2203/021* (2013.01)

(58) Field of Classification Search
USPC .......................................... 392/482, 465, 479
See application file for complete search history.

(56) References Cited

U.S. PATENT DOCUMENTS

2007/0070324 A1* 3/2007 Kuit ...................... G03F 7/7075 355/72
2013/0302021 A1* 11/2013 Furumura ............. F24H 9/0057 392/491
2015/0241147 A1* 8/2015 Brooks .................. C08K 3/042 165/185

* cited by examiner

FILM TYPE LIQUID HEATER AND UNIFORM HEATING METHOD THEREOF

This application claims the priority benefit of Chinese Application No. 202011178865.9, filed Oct. 29, 2020, which is hereby incorporated by reference.

TECHNICAL FIELD OF THE INVENTION

The present invention relates to a liquid heater with high cleanliness and under precise temperature control, and in particular to a heating film type liquid heater and a uniform heating method thereof.

BACKGROUND OF THE INVENTION

Liquid with high cleanliness and precise temperature control is needed in many semiconductor industry applications. It is often necessary to provide pipeline heaters in the liquid pipeline system to precisely heat a liquid flow and control its temperature. Particularly, pipeline heaters suitable high-cleanliness applications are needed to adjust the temperature of liquid. For example, in an immersion lithography system, to realize better lithography effects and higher exposure quality, it is necessary to fill immersion liquid flowing stably between a projection lens and a wafer substrate. To ensure that the immersion liquid flow influences minimally on the laser beam that passes through the immersion liquid flow, it is required to precisely control the temperature of the immersion liquid flow and make its optical properties uniform. Usually, before the immersion liquid flows into an immersion hood, the temperature of the immersion liquid is required to be precisely controlled by using heaters, condensers, heat exchangers or the like. However, since the existing heaters have no specific design for the heating uniformity, there will be temperature difference for the immersion liquid flow in different positions after it flows through the existing heaters, due to the contact time difference of the interior immersion liquid with the heating element and the too short heat conduction time. The immersion liquid with the temperature difference will affect the precision of subsequent temperature measurement and feedback adjustment and thus affect the exposure quality of the lithography system.

Chinese Invention Patent Application CN201310013555.5 has disclosed an electric heater body structure for heating liquid and a manufacturing method thereof. In this invention patent, the main body is a heat acceptor. A pipeline is arranged inside the heat acceptor for the liquid to flow and be heated, and a resistance heating film is arranged outside the heat acceptor. The resistance heating film generates heat and exchanges heat through the heat acceptor with the liquid to be heated, and the liquid flows out from one side of the pipeline after it is heated. It is easily occurred that the resistance heating film generates heat unevenly, resulting in local temperature that is too high and reducing the service life or even leading to damage. The resistance heating film and the heat receptor will transfer heat outward while transferring heat inward, so that the devices beside the heating device will rise in temperature, resulting harm or even damage to the device. Therefore, it is not suitable for devices with high component integration.

Chinese Invention Patent Application CN201721225348.6 has disclosed a stable, durable and safe liquid heating tube. This invention patent provides a liquid heater with a ceramic tube. A heating film is arranged outside the ceramic tube, and heat generated by the heating film is transferred by the ceramic tube to liquid to be heated that flows in the in the ceramic tube, so that the temperature of the liquid in the ceramic tube is increased. Due to the difference in heat transfer rate between the liquid and the tube as well as between liquids, there is a temperature difference inside the heated liquid. Therefore, it is not suitable for devices having high requirements for liquid temperature control.

Chinese Invention Patent Application CN201310703225.9 has disclosed a non-metal inner nozzle electric heater. In this invention patent, a heating film is arranged on an inner side of the wall and directly contacts with liquid to be heated. Since the contact point of the heating film is immersed in the liquid, there is a risk of electric leakage. Although the wall is made of insulating material, the electricity will leak from the liquid outlet. In this invention patent, the liquid is fed from the lower side and discharged from the upper side, and the heated liquid is discharged from the upper side since hot liquid flows upward and cold liquid flows downward. However, it is difficult to avoid discharging cold liquid and hot liquid together, resulting in temperature difference inside the discharged liquid.

SUMMARY OF THE INVENTION

The present invention provides a film type liquid heater and a uniform heating method thereof, which solves the problems that there will be a temperature difference in space inside the liquid flow in the existing pipeline heaters due to too short contact time with the heating element and too short heat conduction time and the liquid with the temperature difference will affect the precision of subsequent temperature measurement and feedback adjustment.

To solve the technical problem, the present invention employs the following specific technical solutions. A film type liquid heater is provided, including a heating pipe, wherein a heating film layer is coated around outer surface of the heating pipe, and the heating film layer is electrically connected to an external power supply to realize an electric heating function; connecting pipes are arranged at two axial ends of the heating pipe; a flow splitting column is arranged in an internal space of the heating pipe, the flow splitting column extends in an axial direction of the heating pipe, and a heating chamber is formed between an inner side of the heating pipe and the flow splitting column; flow splitting grooves are formed at two axial ends of the flow splitting column; and, the flow splitting grooves communicates the heating chamber with the through space inside the connecting pipes. Since the liquid flow flows in the heating pipe, by using the heating film as a heating element, the time of heating liquid flow is long, the heating efficiency is high, and the degree of heating uniformity is high. The heating film is coated around the outer wall of the heating pipe, so the electrodes are avoided being arranged in the liquid flow. Due to the presence of the flow splitting column, the liquid flow flows annularly in the heating pipe, so that the contact area of the liquid with the wall of the heating pipe is increased. Therefore, the temperature difference in space of the liquid flow can be more reduced, and it is advantageous to improve the precision of subsequent temperature measurement and feedback adjustment of the liquid. The temperature uniformity of the immersion liquid is improved, and the exposure quality of the lithography machine is thus improved.

Preferably, the heating film layer contains a graphene material. Higher electro-thermal conversion efficiency can be realized, and the temperature on the heating surface becomes more uniform.

Preferably, sealing covers are arranged at two axial ends of the heating pipe, the sealing covers are fixedly connected to the connecting pipes, the sealing covers are pressed against axial end faces of the heating pipe, and sealing rings are arranged between the sealing covers and the axial end faces of the heating pipe. The heating pipe is compressed and fixed by the axial pre-tightening force exerted by the sealing covers, so that two ends of the heating pipe are prevented from suffering from a too large radial assembly force, and it is advantageous to protect the brittle heating pipe material.

Preferably, sealing connection components are arranged at two ends of the heating pipe; each of the sealing connection components includes a sealing cover, a compression baffle, a pre-tightening bolt, a fastening nut, a pre-tightening spring and a fastening connector; the fastening connectors are arranged on an outer side of the heating pipe and an inner side of the barrel; the two sealing covers are arranged on outer sides of inner ends of the left and right connecting pipes and fixedly connected to the connecting pipes, respectively; the two compression baffles are arranged on outer sides of the sealing covers at the respective ends; the heating pipe is connected between the inner sides of the two sealing covers on the left and right ends; the fastening connectors run through the left and right compression baffles; the fastening nuts are fixedly connected to right ends of the fastening connectors through threads and compressed onto out end faces of the right compression baffles; the pre-tightening nuts compress the pre-tightening springs sleeved on the fastening connectors onto outer end faces of the left compression baffles; and, the fastening nuts, the fastening connectors, the pre-tightening nuts and the pre-tightening springs are coordinated to exert a pre-tightening force on two axial ends of the heating pipe and the sealing covers so as to realize tight connection between the heating pipe and the sealing covers. The reliability and effectiveness of sealing connection are improved, two ends of the heating pipe are prevented from suffering from a too large radial assembly force, and it is advantageous to protect the heating pipe if it is made of brittle material; and, due to the use of the pre-tightening springs, it is convenient to adjust the magnitude of the exerted pre-tightening force, the fastening nuts can be prevented from loosening, and it is more advantageous to ensure the compression of the sealing covers onto the heating pipe and achieve higher sealing reliability.

Preferably, the fastening connectors are at least two rods uniformly distributed in a circumferential direction. A more uniform assembly force is exerted to the heating pipe, and the reliability and effective of sealing connection are improved.

Preferably, the fastening connectors are at least two rods uniformly distributed in a circumferential direction.

Preferably, the sealing covers are provided with protrusions surrounding the radial outer side of the heating pipe. It is convenient to mount and position the heating pipe and prevent the radial slip of the heating pipe.

Preferably, the heating pipe is of a quartz glass structure or a stainless steel structure or a fluorine-containing plastic structure. It is advantageous to reduce the discharge of pollutants into the liquid flow.

Preferably, the flow splitting column is of a stainless steel structure or a fluorine-containing plastic structure. It is advantageous to reduce the discharge of pollutants into the liquid flow, and it is ensured that the heat of the heating pipe is rapidly transferred to the flow splitting column.

Another object of the present invention is to provide a uniform heating method for a film type liquid heater, comprising the following steps:

A1. electrifying a wire connected to the electrode layers by an external power supply, and providing energy is to heat the heating film layer described in one of the above technical solutions after the electrode layers are electrified;

A2. electrifying the heating film layer to generate heat, and transferring the heat inward to the heating pipe and the flow splitting column described in one of the above technical solutions and transferring the heat outward to the barrel;

A3. flowing liquid into the film type liquid heater described in one of the above technical solutions from an outer side of the connecting pipes and then into the heating chamber described in one of the above technical solutions through the connecting pipes and the flow splitting grooves; and A4. since the heating chamber being formed by the inner side of the heating pipe and the flow splitting column, the inner and outer sides of the liquid flowing in the heating chamber exchanging heat with the flow splitting column and the heating pipe, respectively, and heating the liquid uniformly and rapidly and then flowing out the liquid through the flow splitting grooves and the connecting pipes at the other end after the liquid is heated to a desired temperature.

Since the liquid flow flows in the heating pipe, by using the heating film as a heating element, the time of heating liquid flow is long, the heating efficiency is high, and the degree of heating uniformity is high. The heating film is coated around the outer surface of the heating pipe, so the electrodes are prevented from being arranged in the liquid flow. Due to the presence of the flow splitting column, the liquid flow flows annularly in the heating pipe, so that the contact area of the liquid with the wall of the heating pipe is increased. Moreover, the temperature difference in space of the liquid flow can be reduced, and it is advantageous to improve the precision of subsequent temperature measurement and feedback adjustment of the liquid.

Preferably, the following steps will be executed before the electrification in the step A1 is executed:

B1. exerting a pre-tightening force to fastening connectors, and pre-tightening springs storing the pre-tightening force and locking the stored pre-tightening force by pre-tightening nuts to realize tight connection between the heating pipe and the sealing covers so as to ensure good sealing performance of the film type liquid heater; and B2. fixedly connecting the film type liquid heater to an immersion lithography system by end fixation plates, wherein the fixation direction may be changed arbitrarily since two ends of the heating film type liquid heater can realize the inflow or outflow of liquid.

The present invention has the following beneficial effects. Since the liquid flows in the heating pipe, by using the heating film as a heating element, the time of heating liquid flow is long, the heating efficiency is high, and the degree of heating uniformity is high. The heating film is coated around the outer surface of the heating pipe, so the electrodes are prevented from being arranged in the liquid flow. Due to the presence of the flow splitting column, the liquid flow flows annularly in the heating pipe, and both the inner and outer sides of the annular liquid flow come into contact with the heat transfer wall, so that the contact area of the liquid with the heat transfer wall is increased. Moreover, the temperature difference in space of the liquid flow can be reduced, and it is advantageous to improve the precision of subsequent temperature measurement and feedback adjustment of the liquid. For the heating pipe made of the optional brittle and high-cleanliness material, it is mounted in such a manner that it is compressed by exerting a pre-tightening force in the axial direction, so it is ensured that no rupture and damage will occur near the axial end faces of the heating pipe due to a too large radial compression assembly force.

BRIEF DESCRIPTION OF THE DRAWINGS

The present invention will be further described below in detail by specific implementations with reference to the accompanying drawings.

DETAILED DESCRIPTION OF THE INVENTION

Embodiment 1

Figure 1:
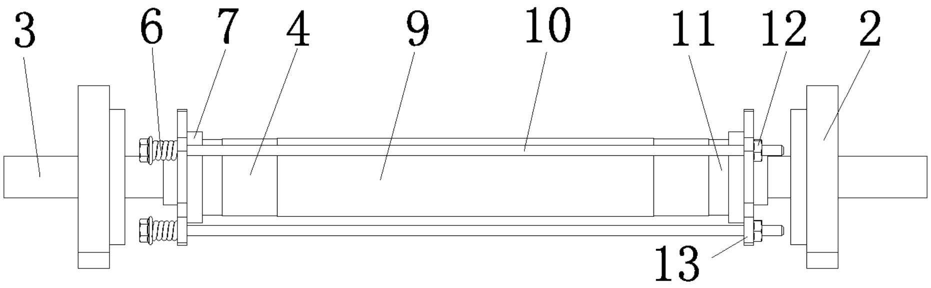
FIG. 1 is an internal structure diagram of a film type liquid heater according to the present invention.
Figure 2:
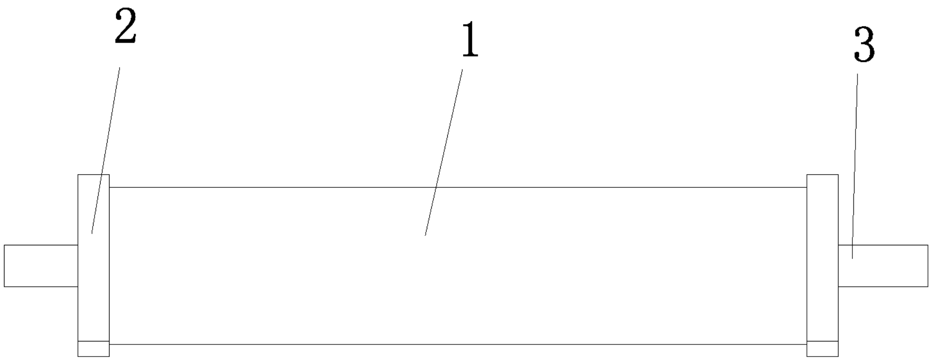
FIG. 2 is front view of the film type liquid heater according to the present invention.
Figure 3:
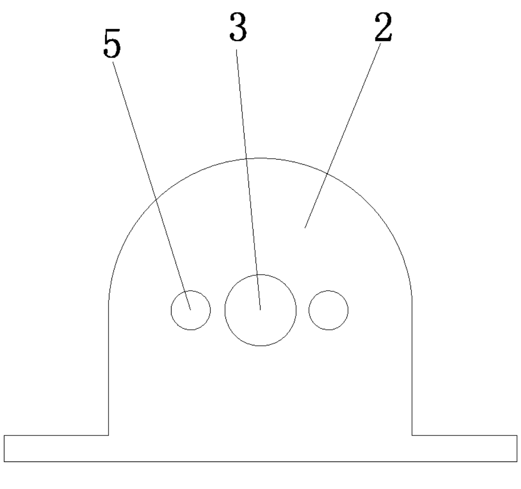
FIG. 3 is a left view of FIG. 2.
Figure 4:
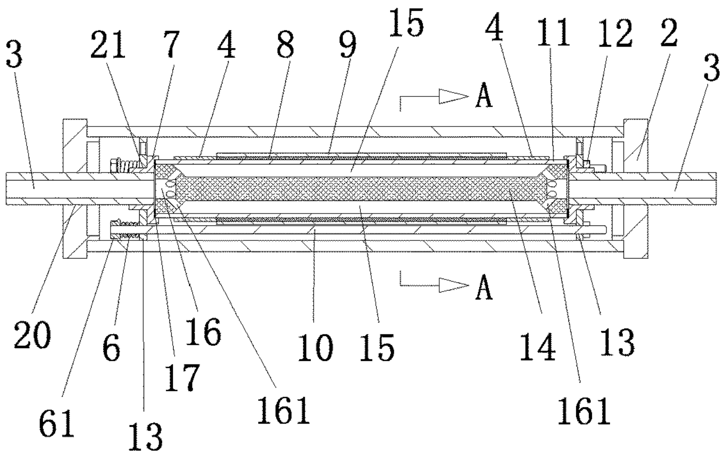
FIG. 4 is a sectional view of FIG. 2.
Figure 5:
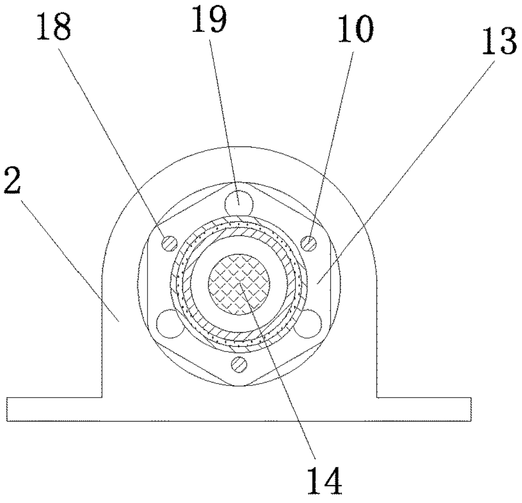
FIG. 5 is a structure diagram of FIG. 4 along A-A.
Figure 6:
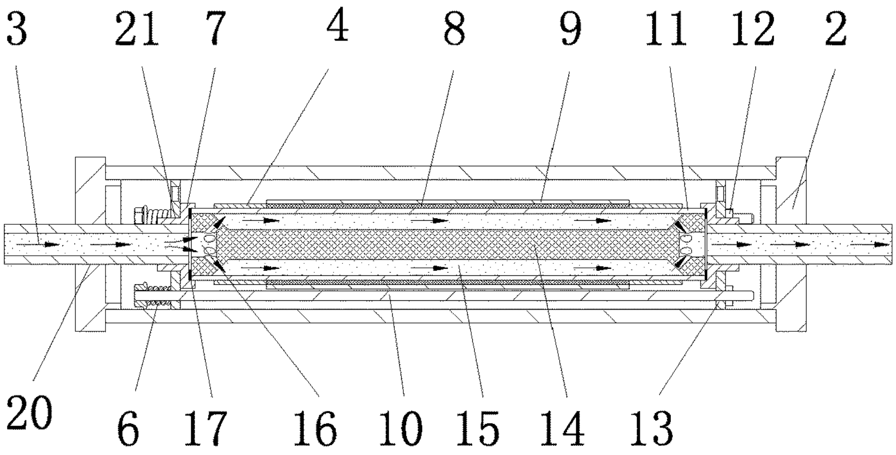
FIG. 6 is a structure diagram of an internal flow field of the film type liquid heater according to the present invention.

In the embodiment shown in FIGS. 1, 2, 3, 4, 5 and 6, a film type liquid heater is provided, including a heating pipe 11, a barrel 1, end fixation plates 2 and connecting pipes 3. The end fixation plates 2 are mounted and fixedly connected at two ends of the barrel 1. The heating pipe 11 is arranged in the barrel 1. Pipe ports 20 and first cable ports 5 run through the end fixation plates 2 at two ends, respectively. The connecting pipes 3 are fixedly mounted and connected in the pipe ports 20. Sealing connection components of the heating pipe 11 are mounted and connected at inner ends of the two connecting pipes 3. A heating film layer 8 is coated around the outer surface of the heating pipe 11. Electrode layers 4 are arranged at two axial ends of the heating film layer 8, respectively. The electrode layers 4 are connected to an external power supply through connecting wires. An insulating layer 9 is coated outside the heating film layer 8. A flow splitting column 14 is mounted and fixedly connected in the heating pipe 11. An annular heating chamber 15 is formed between an inner side of the heating pipe 11 and the flow splitting column 14. Flow splitting grooves 16 are formed at left and right ends and on an inner side of the flow splitting column 14. Two outer sides of the flow splitting grooves 16 are communicated with the connecting pipes 3, and the flow splitting grooves 16 are communicated with the heating chamber 15. Since the liquid flow flows in the heating pipe, by using the heating film as a heating element, the time of heating liquid flow is long, the heating efficiency is high, and the degree of heating uniformity is high. The heating film is coated around the outer surface of the heating pipe, so the electrodes are prevented from being arranged in the liquid flow. Due to the presence of the flow splitting column, the liquid flow flows annularly in the heating pipe, so that the contact area of the liquid with the wall of the heating pipe is increased. Moreover, the temperature difference in space of the liquid flow can be better reduced, and it is advantageous to improve the precision of subsequent temperature measurement and feedback adjustment of the liquid. The barrel 1, as a rigid housing of the film type liquid heater of the present invention, can avoid the mechanical deformation of the device of the present invention after long-term use, and is also used for reducing the heat emitted outward during the heating process of the device of the present invention. The barrel 1 may be circular, square or in any other shapes. The size and position of the pipe ports 20 and the first cable ports 5 can be changed, and the number of the pipe ports 20 and the first cable ports 5 can be increased or decreased and not unique. Preferably, the heating film layer 8 may be made of graphene. The graphene heating film is high in electro-thermal conversion efficiency, and the temperature on the heating surface is uniform. The heating pipe 11 is made of high-temperature-resistant, wear-resistant and corrosion-resistant material, so that the service life and the reliability and effectiveness in use of the heating pipe are improved. The flow splitting grooves 16 communicate a plurality of communication grooves 161 communicated with the heating chamber 15. The communication grooves 161 are obliquely communicated between the flow splitting grooves 16 and the heating chamber 15. The communication grooves 161 guide the columnar liquid flow in the connecting pipes 3 into an annular liquid flow and allow the liquid to flow into the heating chamber 15. As shown in FIG. 4, the sealing covers are arranged at two axial ends of the heating pipe; the sealing covers are fixedly connected to the connecting pipes; the sealing covers are pressed against axial end faces of the heating pipe; and, sealing rings are arranged between the sealing covers and the axial end faces of the heating pipe. Sealing connection components are arranged at two ends of the heating pipe. Each of the sealing connection components includes a sealing end cover 7, a compression baffle 13, a pre-tightening nut 61, a fastening nut 12, a pre-tightening spring 6 and a fastening connector 10. The fastening connectors 10 are arranged on an outer side of the heating pipe 11 and an inner side of the barrel 1. The fastening connectors are arranged on the outer side of the heating pipe and the inner side of the barrel, and the fastening connectors are at least two rods uniformly distributed in a circumferential direction. The two sealing covers 7 are mounted and fixedly connected on outer sides of inner ends of the left and right connecting pipes 3 and fixedly connected to the connecting pipes 3, respectively. The two compression baffles 13 are arranged on outer sides of the sealing covers 7 at the respective ends, and exert a pre-tightening force to the outer sides of the sealing covers 7. The heating pipe 11 is mounted and connected between the inner sides of the two sealing covers 7 on the left and right ends. The fastening connectors 10 run through the compression baffles 13 on the left and right sides. The fastening nuts 12 are fixedly connected to right ends of the fastening connectors 10 through threads and compressed onto out end faces of the right compression baffles 13. The left ends of the fastening connectors 10 are fixedly connected to the pre-tightening nuts 61 through threads on the outer sides of the compression baffles 13. The pre-tightening nuts 61 compress the pre-tightening springs 6 sleeved on the fastening connectors 10 onto outer end faces of the left compression baffles 13. The fastening nuts 12, the fastening connectors 10, the pre-tightening nuts 61 and the pre-tightening springs 6 are coordinated to exert a pre-tightening force on two axial ends of the heating pipe 11 and the sealing covers 7 so as to realize tight connection between the heating pipe 11 and the sealing covers 7. Compared with the application of a pre-tightening force by the fastening nuts 12, the pre-tightening springs 6 cooperates with the fastening nuts 12 to exert a pre-tightening force, so that it is more convenient to adjust the magnitude of the exerted pre-tightening force. Moreover, the fastening nuts 12 can be prevented from loosening, and it is more advantageous to ensure the compression of the sealing covers 7 onto the heating pipe 11 and achieve higher sealing reliability. Sealing rings 17 are fixedly mounted between the sealing covers 7 and the heating pipe 11. Mounting and connection limiting grooves are formed at ends of the sealing covers 7 connected to the heating pipe 11. The sealing rings 17 are arranged in the mounting and connection limiting grooves. The outer end of the heating pipe 11 is pressed against the sealing rings 17 in the mounting and connection limiting grooves. The sealing covers 7 are provided with protrusions surrounding the radial outer side of the heating pipe 11, so that it is convenient to mount and position the heating pipe and prevent the radial slip of the heating pipe. The first through holes 21, second cable ports 19 and second through holes 18 run through the compress baffles 13. The sealing covers 7 are connected through the first through holes 21. The sealing covers 7 are of step-like sealing end cover structure. The second cable ports 19 are used for leading out the wires of electrical devices inside the heater. The fastening connectors 10 run through the second through hole 18 on the left sealing end cover 7 and the second through hole 18 on the right sealing end cover 7. The size and position of the first through holes 21, the second cable ports 19 and the second through holes 18 can be changed, and the numbers of the first through holes 21, the second cable ports 19 and the second through holes 18 can be increased or decreased and not unique. The aperture of the first through holes 21 is greater than that of the second through holes 18. The second cable ports 19 are provided to lead out the wires of electrical devices inside the device of the present invention, so that the wires are prevented from contacting with the heating pipe 11 by mistake due to length or gravity and thus resulting in safety problems such as circuit burning. The heating pipe is of a quartz glass structure or a stainless steel structure, preferably a quartz glass structure or a high-cleanliness stainless steel structure, so that it is difficult to introduce pollution impurities into the liquid when flowing through the heating pipe 11. The flow splitting column 14 is of a high-heat-conductivity structure, for example, a stainless steel structure, preferably high-cleanliness stainless steel structure. The heat transfer to the inner core of the liquid flow can be promoted, the inner and outer sides of the liquid flowing into the heating chamber 15 can be uniformly heated, and the temperature difference caused by untimely transfer of heat from the wall of the heating pipe when the liquid flows through the heating pipe is avoided. Generally, compared with the stainless steel material, the quartz glass material produces less pollutant and has a smaller heat conductivity coefficient. Therefore, the heating pipe is made of a quartz glass material and the flow splitting column is made of a stainless steel material, so that as few pollutants as possible can be produced and the capability to conduct heat to the flow splitting column as quickly as possible is provided. The heating pipe may be made of fluorine-containing plastics such as polytetrafluoroethylene (PTFE) or polyfluoroalkoxy (PFA), and the flow splitting column may also be made of fluorine-containing plastics such as polytetrafluoroethylene (PTFE) or polyfluoroalkoxy (PFA). Thus, the discharge of pollutants into the liquid flow is reduced, and the tolerance to the acidic liquid becomes better.

In the present invention, by the liquid temperature control technology, the time of heating liquid flow is long, the heating efficiency is high, and the degree of heating uniformity is high. The liquid flow is allowed to flow annularly in the hear pipe, so that the inner and outer sides of the annular liquid flow come into with the heat transfer wall, and the contact area of the liquid with the heat transfer wall is increased. Moreover, the temperature difference in space of the immersion liquid flow can be better avoided, and the precision of subsequent temperature measurement and feedback adjustment of the liquid is improved. If the device of the present invention is applied to an immersion liquid feeding device for an immersion lithography machine, the temperature uniformity of the immersion liquid can be improved, and the exposure imaging quality of the lithography machine can thus be improved. Moreover, in the present invention, by providing fastening connectors and pre-tightening springs on the outer side of the heating pipe, and by exerting a pre-tightening force to the fastening connectors, the pre-tightening springs store the pre-tightening force and lock the stored pre-tightening force by nuts to realize tight connection between the heating pipe and the sealing covers so as to ensure good sealing performance of the present invention. The heating pipe made of brittle high-cleanliness material such as quartz is mounted in such a manner that it is compressed by exerting a pre-tightening force in the axial direction, so it can be ensured that no rupture and damage will occur near the axial end faces of the heating pipe due to a too large radial assembly force. In the present invention, since quartz, stainless steel or fluorine-containing plastics is used as material for manufacturing the heating pipe, it is difficult to produce pollution impurities when the liquid flows through the heating pipe. The heating film later contains graphene material. Thus, higher electro-thermal conversion efficiency can be achieved, and the temperature on the heating surface is more uniform. In the present invention, by using graphene as the material for manufacturing the heating film layer, the electro-thermal conversion efficiency is high, and the temperature on the heating surface is uniform. In the present invention, by using graphene and providing the flow splitting column in the heating pipe, the inner and outer sides of the liquid flowing into the heating chamber can be heated uniformly, so that the temperature difference of the liquid due to uneven heating or different heat transfer rate is avoided. In the present invention, by providing the barrel, the mechanical deformation of the device of the present invention after long-term use can be avoided, and the heat emitted outward during the heating process in the present invention can also be reduced.

Embodiment 2

In the embodiment shown in FIGS. 1, 2, 3, 4, 5 and 6, a uniform heating method for a film type liquid heater is provided, including the following steps.

A1. A wire connected to the electrode layers 4 described in Embodiment 1 is electrified by an external power supply, and energy is provided to heat the heating film layer 8 after the electrode layers 4 are electrified.

A2. The heating film layer 8 is electrified to generate heat, and the heat is conducted inward to the heating pipe 11 and the flow splitting column 14 described in Embodiment 1 and conducted outward to the barrel 1.

A3. Liquid flows into the film type liquid heater described in Embodiment 1 from an outer side of the connecting pipes 3 and then into the heating chamber 15 described in Embodiment 1 through the connecting pipes 3 and the flow splitting grooves 16 (as indicated by the arrow in FIG. 6).

A4. Since the heating chamber 15 is formed by the inner side of the heating pipe 11 and the flow splitting column 14, the inner and outer sides of the liquid flowing in the heating chamber 15 can exchange heat with the flow splitting column 14 and the heating pipe 11, respectively, and the liquid is heated uniformly and rapidly and then flows out through the flow splitting grooves 16 and the connecting pipes 3 at the other end after the liquid is heated to a desired temperature (as indicated by the arrow in FIG. 6).

The following steps will be executed before the electrification in the step A1 is executed.

B1. A pre-tightening force is exerted to fastening connectors 10, and pre-tightening springs 6 store the pre-tightening force and lock the stored pre-tightening force by nuts 12 to realize tight connection between the heating pipe 11 and the sealing covers 7 so as to ensure good sealing performance of the film type liquid heater.

B2. The film type liquid heater is fixedly connected to an immersion lithography system by end fixation plates 2, wherein the fixation direction may be changed arbitrarily since two ends of the film type liquid heater can realize the inflow or outflow of liquid.

In the description of the position relation in the present invention, the orientation or position relation indicated by terms "inner", "outer", "upper", "lower", "left", "right" or the like is an orientation or position relation shown by the accompanying drawings, merely for describing the embodiments and simplifying the description, rather than indicating or implying that the specified device or element must have a particular orientation or be constructed and operated in a particular orientation. Therefore, the terms should not be interpreted as limitations to the present invention.

The basic principles and main features of the products of the present invention and the advantages of the present invention have been described by the foregoing contents and structures. However, it should be understood by those skilled in the art that, the above examples and description merely show the principle of the present invention, various variations and improvements may be made to the present invention without departing from the spirit and scope of the present invention, and these variations and improvements shall fall into the protection scope of the present invention. The protection scope of the present invention shall be defined by the appended claims and equivalents thereof.

The invention claimed is:

1. A film type liquid heater, comprising a heating pipe, wherein a heating film layer is coated around an outer surface of the heating pipe, and the heating film layer is electrically connected to an external power supply to realize an electric heating function; connecting pipes are arranged at two axial ends of the heating pipe; a flow splitting column is arranged in an internal space of the heating pipe, the flow splitting column extends in an axial direction of the heating pipe, and a heating chamber is formed between an inner side of the heating pipe and the flow splitting column; the flow splitting column is only directly mounted and fixedly connected [with] at the two axial ends of the heating pipe; the flow splitting column is made of a stainless steel material; flow splitting grooves are formed at two axial ends of the flow splitting column; and the flow splitting grooves communicate the heating chamber with a through space inside the connecting pipes; two sealing connection components are arranged at two ends of the heating pipe, respectively; each of the sealing connection components comprises a sealing cover, a compression baffle, a pre-tightening nut, a fastening nut, a pre-tightening spring and a fastening connector; the fastening connectors are arranged on an outer side of the heating pipe and an inner side of a barrel; two sealing covers are respectively arranged on outer sides of inner ends of the connecting pipes and fixedly connected to the connecting pipes, respectively; the two compression baffles are respectively arranged on outer sides of the sealing covers at the respective ends; the heating pipe is connected between inner sides of the two sealing covers on left and right ends; the fastening connectors respectively run through the two compression baffles; the fastening nuts are fixedly connected to right ends of the fastening connectors through threads and compressed onto outer out end faces of one of the two compression baffles; pre-tightening nuts compress the pre-tightening springs sleeved on the fastening connectors onto outer end faces of the other of the two compression baffles; and, the fastening nuts, the fastening connectors, the pre-tightening nuts and the pre-tightening springs are coordinated to exert a pre-tightening force on two axial ends of the heating pipe and the sealing covers so as to realize tight connection between the heating pipe and the sealing covers; and wherein the heating pipe is of a quartz glass structure.

2. The film type liquid heater according to claim 1, wherein the heating film layer contains a graphene material.

3. The film type liquid heater according to claim 1, wherein sealing covers are arranged at two axial ends of the heating pipe, the sealing covers are fixedly connected to the connecting pipes, the sealing covers are pressed against axial end faces of the heating pipe, and sealing rings are arranged between the sealing covers and the axial end faces of the heating pipe.

4. The film type liquid heater according to claim 1, wherein the fastening connectors comprise at least two rods uniformly distributed in a circumferential direction.

5. The film type liquid heater according to claim 1, wherein the sealing covers are provided with protrusions surrounding the radial outer side of the heating pipe.

6. A uniform heating method for a film type liquid heater, comprising the following steps:

A1. connecting a wire to electrode layers according to claim 1 is electrified by an external power supply, and energy is provided to heat the heating film layer according to claim 1 after the electrode layers are electrified;

A2. electrifying the heating film layer to generate heat, and conducting the heat inward to the heating pipe and the flow splitting column according to claim 1 and conducted outward to the barrel;

A3. liquid flowing into the film type liquid heater according to claim 1 from an outer side of the connecting pipes and then into the heating chamber according to claim 1 through the connecting pipes and the flow splitting grooves; and A4. the liquid flowing in the heating chamber exchanging heat with the flow splitting column and the heating pipe, respectively, and heating the liquid uniformly and rapidly and then flowing out through the flow splitting grooves and the connecting pipes at the other end after the liquid [being] is heated to a desired temperature.

7. A uniform heating method for a film type liquid heater according to claim 6, wherein the following steps are executed before the electrification in the step A1 is executed:

B1. exerting a pre-tightening force to fastening connectors, and pre-tightening springs storing the pre-tightening force and locking the stored pre-tightening force by pre-tightening nuts to realize tight connection between the heating pipe and sealing covers so as to ensure good sealing performance of the film type liquid heater; and B2. fixedly connecting the film type liquid heater to a machine in need of heating by end fixation plates, wherein the fixation direction may be changed arbitrarily since two ends of the film type liquid heater can realize the inflow or outflow of liquid.

8. A film type liquid heater, comprising a heating pipe, wherein a heating film layer is coated around an outer surface of the heating pipe, and the heating film layer is electrically connected to an external power supply to realize an electric heating function; connecting pipes are arranged at two axial ends of the heating pipe; a flow splitting column is arranged in an internal space of the heating pipe, the flow splitting column extends in an axial direction of the heating pipe, and a heating chamber is formed between an inner side of the heating pipe and the flow splitting column; the flow splitting column is only directly mounted and fixedly connected [with] at the two axial ends of the heating pipe; the flow splitting column is made of a stainless steel material; flow splitting grooves are formed at two axial ends of the flow splitting column; and the flow splitting grooves communicate the heating chamber with a through space inside the connecting pipes; two sealing connection components are arranged at two ends of the heating pipe, respectively; each of the sealing connection components comprises a sealing cover, a compression baffle, a pre-tightening nut, a fastening nut, a pre-tightening spring and a fastening connector; the fastening connectors are arranged on an outer side of the heating pipe and an inner side of a barrel; two sealing covers are respectively arranged on outer sides of inner ends of the connecting pipes and fixedly connected to the connecting pipes, respectively; the two compression baffles are respectively arranged on outer sides of the sealing covers at the respective ends; the heating pipe is connected between inner sides of the two sealing covers on left and right ends; the fastening connectors respectively run through the two compression baffles; the fastening nuts are fixedly connected to right ends of the fastening connectors through threads and compressed onto outer end faces of one of the two compression baffles; pre-tightening nuts compress the pre-tightening springs sleeved on the fastening connectors onto outer end faces of the other of the two compression baffles; and, the fastening nuts, the fastening connectors, the pre-tightening nuts and the pre-tightening springs are coordinated to exert a pre-tightening force on two axial ends of the heating pipe and the sealing covers so as to realize tight connection between the heating pipe and the sealing covers;

wherein the heating pipe is of a quartz glass structure;

wherein the heating film layer contains a graphene material;

wherein sealing covers are arranged at two axial ends of the heating pipe, the sealing covers are fixedly connected to the connecting pipes, the sealing covers are pressed against axial end faces of the heating pipe, and sealing rings are arranged between the sealing covers and the axial end faces of the heating pipe; and wherein the fastening connectors comprise at least two rods uniformly distributed in a circumferential direction; and wherein the sealing covers are provided with protrusions surrounding the radial outer side of the heating pipe.

* * * * *